United States Patent
Williams et al.

(10) Patent No.: US 12,460,605 B2
(45) Date of Patent: Nov. 4, 2025

(54) FUEL INJECTOR

(71) Applicant: PHINIA DELPHI LUXEMBOURG SARL, Belvaux (LU)

(72) Inventors: Anthony John Williams, Middlesex (GB); Kris Sullivan, Gloucestershire (GB); Nicholas More, North London (GB); Daniel Pearce, London (GB)

(73) Assignee: PHINIA DELPHI LUXEMBOURG SARL, Belvaux (LU)

( * ) Notice: Subject to any disclaimer, the term of this patent is extended or adjusted under 35 U.S.C. 154(b) by 0 days.

(21) Appl. No.: 18/835,624

(22) PCT Filed: Feb. 3, 2023

(86) PCT No.: PCT/EP2023/052721
§ 371 (c)(1),
(2) Date: Aug. 2, 2024

(87) PCT Pub. No.: WO2023/148347
PCT Pub. Date: Aug. 10, 2023

(65) Prior Publication Data
US 2025/0146456 A1    May 8, 2025

(30) Foreign Application Priority Data

Feb. 3, 2022  (GB) .................................... 2201394
Feb. 3, 2022  (GB) .................................... 2201395

(51) Int. Cl.
*F02M 69/04*    (2006.01)
*F02D 19/02*    (2006.01)
(Continued)

(52) U.S. Cl.
CPC ....... *F02M 21/0254* (2013.01); *F02D 19/021* (2013.01); *F02D 41/0027* (2013.01);
(Continued)

(58) Field of Classification Search
CPC ............. F02M 51/0671; F02M 61/166; F02M 51/061; F02M 51/0614; F02D 41/20; H01F 7/081
(Continued)

(56) References Cited

U.S. PATENT DOCUMENTS

2006/0022072 A1*   2/2006  Ciampolini ............ F02M 61/10
                                                        239/585.4
2011/0186769 A1    8/2011  Mizobe et al.
(Continued)

FOREIGN PATENT DOCUMENTS

| EP | 2863043 A1 | 4/2015 |
|----|------------|--------|
| KR | 102093986 B1 | 3/2020 |
| WO | 2011054925 A1 | 5/2011 |

OTHER PUBLICATIONS

International Search Report for PCT/EP2023/052721 dated May 3, 2023, 3 pages.
(Continued)

*Primary Examiner* — Logan M Kraft
*Assistant Examiner* — James J Kim
(74) *Attorney, Agent, or Firm* — WARNER NORCROSS + JUDD LLP

(57) ABSTRACT

A fuel injector for an internal combustion engine comprising an injection nozzle comprising a nozzle body with a nozzle bore; a valve needle assembly received within the nozzle bore and including a valve needle engageable with a seat region to control fuel delivery through an outlet of the injection nozzle; and a first actuator arrangement operable to apply an opening force to an engagement region of the valve needle assembly to cause an opening movement thereof. The first actuator arrangement comprises a first conductive coil mounted concentrically on a first body and a first armature configured to apply the opening force to the valve needle assembly.

(Continued)

The first body comprises a first, radially inner region having a relatively high magnetic permeability and a second region having a relatively low magnetic permeability, the second region being disposed radially between the first coil and the first, radially inner region.

11 Claims, 4 Drawing Sheets

(51) Int. Cl.
*F02D 41/00* (2006.01)
*F02M 21/02* (2006.01)
*F02M 51/06* (2006.01)
*F02M 63/00* (2006.01)

(52) U.S. Cl.
CPC .... *F02M 21/0206* (2013.01); *F02M 21/0263* (2013.01); *F02M 51/0614* (2013.01); *F02M 63/0022* (2013.01); *F02D 2200/0602* (2013.01)

(58) Field of Classification Search
USPC .......................................................... 123/445
See application file for complete search history.

(56) References Cited

U.S. PATENT DOCUMENTS

| 2014/0001290 | A1* | 1/2014 | Nishida | .............. F02M 51/0685 |
| | | | | 239/585.1 |
| 2016/0069467 | A1 | 3/2016 | Kromer | |
| 2022/0186699 | A1* | 6/2022 | Inaba | ................... F02M 65/005 |

OTHER PUBLICATIONS

Machine assisted English translation of KR102093986B1 obtained from <https://patents.google.com/patent> on Jul. 28, 2024, 5 pages.

* cited by examiner

FUEL INJECTOR

CROSS-REFERENCE TO RELATED APPLICATIONS

This application is the U.S. National Stage of International Application No. PCT/EP2023/052721 filed on 3 Feb. 2023, which claims priority to and all advantages of United Kingdom Application No. 2201394.0 filed on 3 Feb. 2022 and United Kingdom Application No. 2201395.7 filed on 3 Feb. 2022, the contents of which are incorporated herein by reference.

FIELD OF THE INVENTION

The invention relates to the field of fuel injectors for internal combustion engines. In particular, the invention relates to a fuel injector for use in delivering gaseous fuel to an engine, particularly not exclusively hydrogen gas.

BACKGROUND

In a bid to reduce reliance on fossil fuels, there is a growing trend towards the development of internal combustion engines which are based on hydrogen, or other gaseous fuels. While fuel injectors are a well-known and mature technology area, there is significant interest in adapting fuel injectors for the specific demands associated with gaseous fuels to optimise performance of the internal combustion engine. This is not a straightforward challenge due to the different characteristics of the fuel being injected and the nature of the combustion process. As a consequence, existing injectors for gaseous fuels do not yet provide the operating pressure and flow capabilities which are required for optimum performance and lower fuel consumption.

It is against this background that the invention has been devised.

SUMMARY OF THE INVENTION

According to a first aspect of the invention, there is provided a fuel injector for an internal combustion engine, the fuel injector comprising an injection nozzle comprising a nozzle body provided with a nozzle bore; a valve needle assembly received within the nozzle bore and including a valve needle engageable with a seat region to control fuel delivery through at least one outlet of the injection nozzle; at least a first actuator arrangement operable to apply an opening force to an engagement region of the valve needle assembly to cause an opening movement thereof; wherein the first actuator arrangement comprises a first conductive coil mounted concentrically on a first body and a first armature configured to apply the opening force to the valve needle assembly. The first body comprises a first, radially inner region and a second region disposed radially between the first coil and the first region, wherein a magnetic permeability value of the first region is higher than a magnetic permeability value of the second region, in use.

The injector of the invention provides the advantage that the high force requirements for higher pressures and/or flow capabilities are achieved through optimising the magnetic flow path of the conductive coil through the use of regions of different permeability.

The magnetic permeability value of the first region may preferably be at least an order of magnitude higher than the magnetic permeability value of the second region, in use. The relative magnetic permeability value of the first region may be at least 500, in use, while the relative magnetic permeability value of the second region may be at most 50, in use.

In one embodiment, the valve needle assembly further comprises a pull member (for example, a pull tube) engaged with the first armature and operably connected to the valve needle.

The fuel injector may be configured to deliver a gaseous fuel to an internal combustion engine.

The first region may comprise a first material and the second region may comprise a second material. The first and second materials may be welded to each other to form the body.

The first region and the second region may correspond to regions of the same material with different magnetic permeability values.

The fuel injector may further comprise a second actuator arrangement, the second actuator arrangement comprising a second conductive coil mounted on a second body and a second armature configured to apply an opening force to the valve needle assembly, wherein the body of the second actuator arrangement comprises a third, radially inner and a fourth region disposed radially between the second coil and the third region, wherein a magnetic permeability value of the third region is higher than a magnetic permeability value of the fourth region, in use.

The armature of the first actuator arrangement may be slidable with respect to the engagement region. Furthermore, the armature of the first actuator arrangement and the engagement region may be separated by a clearance when the valve needle is engaged with the seat region.

The first actuator arrangement may be operable to cause initial opening of the valve needle assembly and then to decouple from the valve needle assembly in response to said initial opening. The second actuator arrangement may be operable to assist said initial opening and then to complete the opening of the valve needle assembly when the first actuator arrangement decouples from the valve needle assembly.

The second armature may be directly coupled to the valve needle assembly.

BRIEF SUMMARY OF THE DRAWINGS

So that it might be more easily understood, the invention will now be described with reference to the following drawings, in which.

DETAILED DESCRIPTION

Figure 1A:
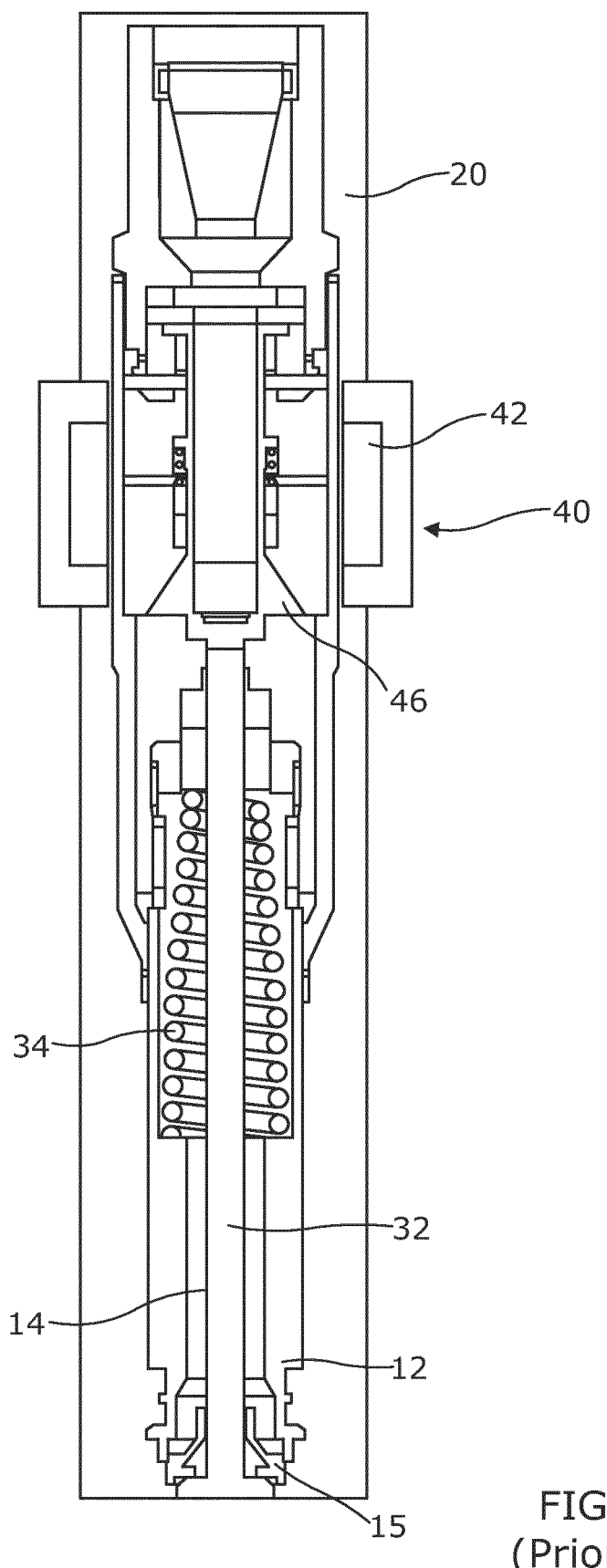
FIGS. 1a and 1b are cross sectional views of a hydrogen fuel injector as according to the state of the art.
Figure 1B:
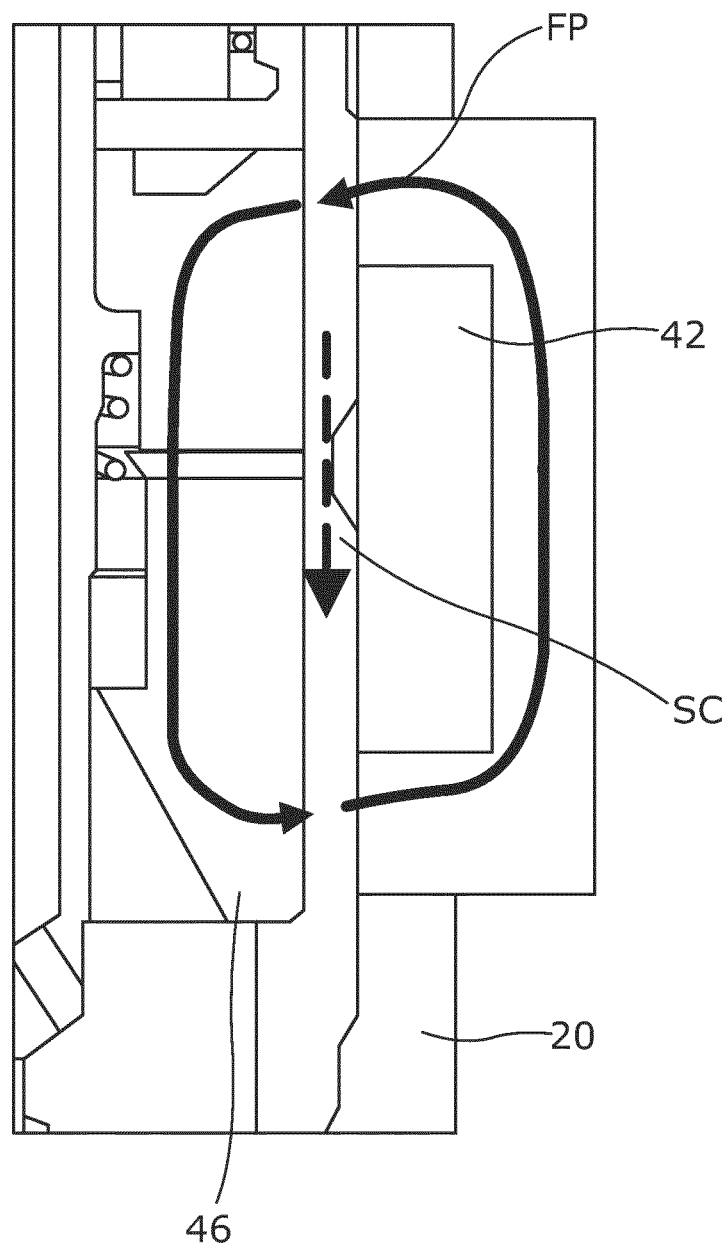

Currently, medium pressure fuel injectors for hydrogen follow similar designs to traditional gasoline direct injection (GDI) injectors, such as those shown in FIGS. 1a and 1b. As can be seen in FIGS. 1a and 1b, such GDI injectors comprise a so-called 'gas tube' construction, in which all moving parts of the injector, including an armature 46 are contained within the gas tube 20 and a coil (or solenoid) 42 and associated wiring are carried on the outside of the gas tube 20. This construction minimises the number of components exposed to the fuel contained within the injector in use.

In more detail, the injector includes a valve needle 32 which is movable within a bore 14 provided in a nozzle body 12. The valve needle 32 is outwardly opening from the bore 14, and the nozzle body 12 defines an annular valve seat 15, at the lower end of the nozzle body 12, with which the valve needle 32 is engageable. A return spring 34 located within the bore 14 applies a return force to the valve needle 32 which serves to bias the valve needle 32 into engagement with the valve seat 15, preventing injection of gaseous fuel into the engine cylinder. Upon application of an actuation force, the valve needle 32 is urged outwardly from the bore 14, away from the valve seat 15, opening the valve seat 15 and allowing gaseous fuel to be delivered into the engine cylinder.

The actuator 40 for the valve needle 32 includes a coil 42 which surrounds the armature 46 which is carried by the valve needle 32. As a current is applied to the coil 42, an electromagnetic field is generated which acts on the armature 46, causing it to be moved downwardly (in the illustration shown) and moving the valve needle 32 out away from the valve seat 15 against the force of the return spring 34, thereby allowing fuel to flow out of the injector.

However, when applying the design of FIGS. 1a and 1b to use with hydrogen fuel, the flow of hydrogen is limited to 15 g/s at a pressure of 40 bar. As hydrogen has a lower volumetric energy density than gasoline or diesel, it is desirable to increase both the injection pressure and the flow capabilities of these injectors in order to improve engine performance and lower fuel consumption. Since the size of the injectors is limited by the space available in the internal combustion engine, these capabilities must be improved by increasing the actuation force provided by the coil.

This presents a significant design challenge, as operating at a higher pressure necessitates a thickening of the walls of the gas tube. However, this directly reduces the useful magnetic flux produced by the coil that can act on the armature. FIG. 1b shows the desired 'useful' magnetic flux path FP that acts on the armature to provide the actuation force but also shows the short circuit flux path SC that passes through the walls of the gas tube 20. Magnetic flux passing through the walls of the gas tube 20 as shown does not act to provide the actuation force on the armature 46 and is therefore wasted. The wasted magnetic flux can be minimised by using a gas tube with a minimised wall thickness.

In fuel injector designs of the type shown in FIGS. 1a and 1b, therefore, any attempt to increase the operating pressure and/or the flow area of the fuel subjects the gas tube wall thickness to competing and opposite demands from the mechanical and magnetic requirements on the system, respectively.

The injector shown in FIGS. 1a and 1b is of the type having a single coil which acts on a single armature carried by the valve needle. In the following examples of the invention in FIG. 2, the injector includes two coils, although it will be discussed in further detail below that only a single coil may be required in other embodiments.

Figure 2:
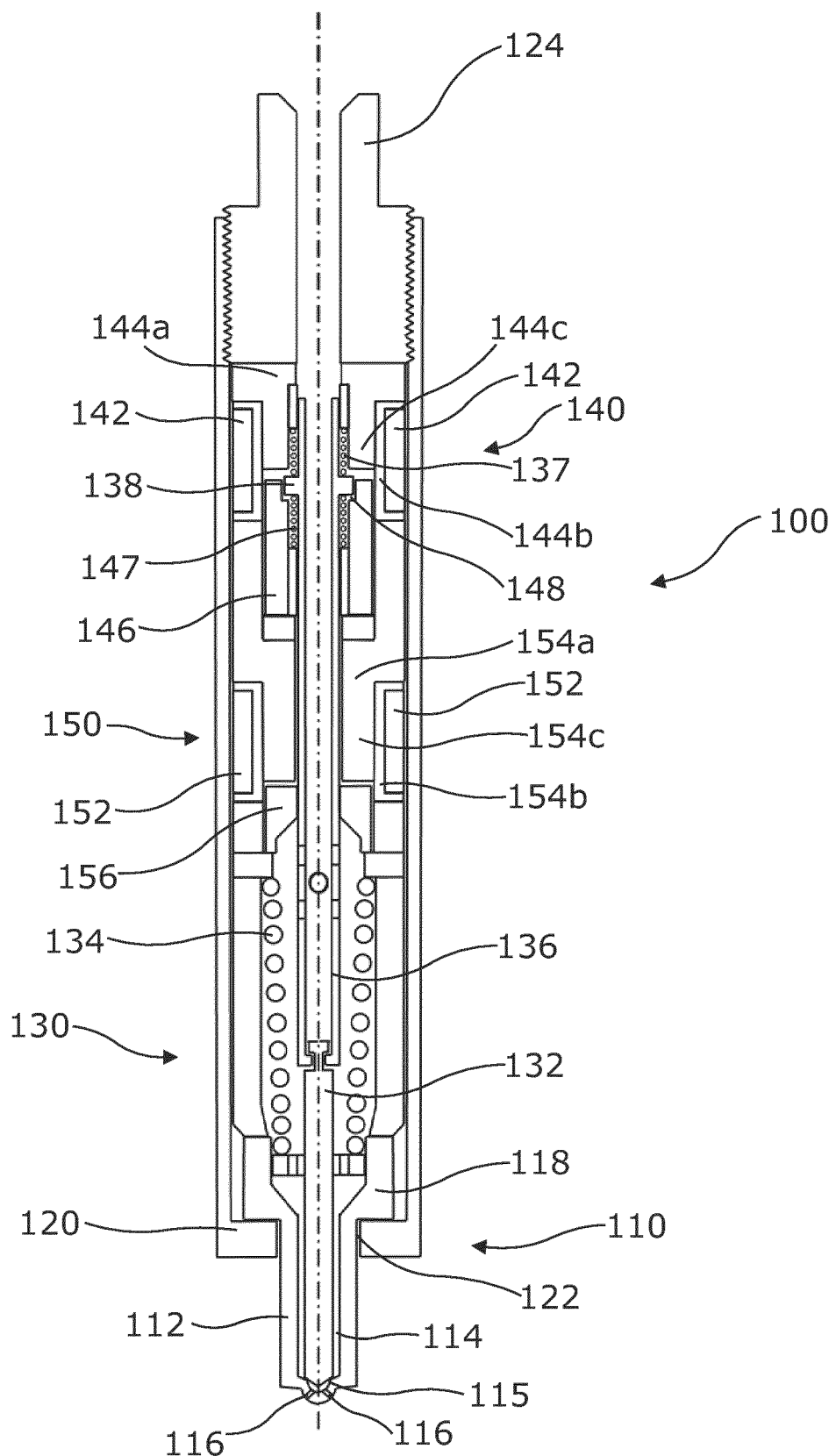
FIG. 2 is a cross sectional view of a fuel injector according to one embodiment of the present invention.

FIG. 2 shows a first embodiment of a fuel injector 100 for gaseous fuel for use in an internal combustion engine. The fuel injector 100 is of the inwardly-opening type and comprises an injection nozzle 110 having a substantially cylindrical nozzle body 112, through which extends a nozzle bore 114. The nozzle bore 114 terminates in one or more nozzle outlets 116, which extend through the thickness of the walls of the nozzle body 112 to enable fluid communication between the nozzle bore 114 and the environment external to the fuel injector 100.

At the opposite end of the injection nozzle 110 to the nozzle outlet(s) 116, the nozzle body 112 defines a shoulder region 118 which has an increased outer diameter when compared to the rest of the nozzle body 112. The shoulder region 118 is engaged with a housing 120, such that the nozzle body 112 extends and protrudes through an opening 122 of the housing 120. The housing 120 contains the other components of the fuel injector 100, with the components being held within the housing 120 by a capnut 124.

The fuel injector 100 comprises a valve needle assembly 130 which is operable to control fuel delivery through the at least one nozzle outlet 116. The valve needle assembly 130 comprises a valve needle 132 received within the nozzle bore 114 and engaged with a seat region 115 of the injection nozzle 110 defined at the meeting point between the nozzle bore 114 and the at least one nozzle outlet 116. This defines a 'closed' position of the valve needle assembly 130, with fuel prevented from flowing out of the fuel injector 100 through the nozzle outlet(s) 116, in use. In contrast, an 'open' position of the valve needle assembly 130 is defined when the valve needle 132 is not engaged with the seat region 115, with fuel consequently allowed to flow out of the nozzle outlet(s) 116 via the nozzle bore 114, in use.

The valve needle assembly further comprises a valve needle return spring 134 that is operably engaged with the valve needle 132. The valve needle return spring 134 provides a return force that acts on the valve needle 132, urging it into engagement with the seat region 115. The valve needle assembly may also comprise a pull tube 136, which is operably engaged with the valve needle 132 and extends through the fuel injector 100 away from the injection nozzle 110 and the valve needle assembly 130. A pull tube return spring 137 is mounted concentrically around the pull tube 136 directly above an engagement region 138 thereof, such that the pull tube return spring 137 is coupled to the engagement region and is able to hold the pull tube 136 in engagement with the valve needle 132.

The pull tube 136 is surrounded by a substantially cylindrical gas tube, which substantially fills the space between the housing 120 and the pull tube 132. The gas tube comprises first and second actuator arrangements 140, 150, which are arranged axially in series along a longitudinal axis L of the fuel injector 100. Each actuator arrangement 140, 150 comprises a coil 142, 152, the coil being mounted concentrically on a body 144, 154 in a radially outer region of the respective actuator arrangement 140, 150. The actuator arrangements 140, 150 further comprise armatures 146, 156, located radially inward of the coils 142, 152, which are used to generate a magnetic field. The first armature 146 is slidably mounted on the pull tube 136, with a clearance 148 provided between the first armature 146 and the engagement region 138 of the pull tube 136. The second armature 156 is directly mounted on the pull tube 136 such that it is engaged with an outer surface thereof and such that the motions of the two components are coupled.

Each body 144, 154 comprises two distinct regions: a first, radially inner region 144a, 154a and a second region 144b, 154b located radially between the radially inner region 144a, 154a and the respective coil 142, 152 such that the second region 144b, 154b effectively surrounds the coil 142, 152. Each of the first regions 144a, 154a has a high magnetic permeability, while the second regions 144b, 154b have a low magnetic permeability. As can be seen in FIG. 2, the outward radial extent of the armatures 146, 156 from the longitudinal axis L corresponds to the inward radial extent of the second regions 144b, 154b. Each of the first regions 144a, 154a therefore comprise sub-regions 144c, 154c that are aligned with the armatures 146, 156 parallel to the longitudinal axis L. As will be explained in further detail below, the low magnetic permeability of the second regions 144b, 154b effectively act as a barrier to the passage of magnetic flux therethrough, thereby limiting the 'wasted' magnetic flux that does not act on the armatures 146, 156.

When discussing values of magnetic permeability, it is worth considering that the magnetic permeability of a material changes as a function of the applied magnetic field, H, with the permeability reaching a maximum at small, but non-zero, value of H, subsequently declining and tending towards 1 as the material becomes magnetically saturated. The relevant value of the magnetic permeability of the first regions 144a, 154a and the second regions 144b, 154b, is therefore dependent on the strength of the magnetic field applied by the coils 142, 152. All values subsequently referred to below should be taken to be representative of the values of the magnetic permeability of the respective region 144a, 144b, 154a, 154b in use when subjected to a magnetic field by the coils 142, 152. The first regions (144a, 154a) therefore have higher magnetic permeability values than the second regions (144b, 154b) when in use.

The second regions 144b, 154b should have as low a magnetic permeability as possible. Therefore, the second regions would ideally have a relative permeability (defined as the ratio of the magnetic permeability of the material to that of free space, $\mu_0$) of 1 or as close thereto as possible. Annealed 316 austenitic stainless steel fits this criterion well but may be too soft for the structural requirements of the construction of the gas tube 120. Mechanical treatments to mechanically harden the 316 stainless steel will also harden it magnetically and increase its magnetic permeability). In practice, therefore, the relative permeability of the second regions 144b, 154b is at most 50, preferably at most 40, and more preferably at most 25. Still more preferably, the relative permeability of the second regions 144b, 154b is at most 10.

With regards to the first regions 144a, 154a (including the sub-regions 144c, 154c), while it would be desirable for the first regions 144a, 154a to have as high a magnetic permeability as possible, the required trade off in magnetic and material properties limits this in practice. However, the relative permeability of the first regions 144a, 154a is at least 500 and preferably at least 1000. The first regions 144a, 154a therefore have a magnetic permeability (or equivalently a relative permeability) that is at least an order of magnitude greater than that of the second regions 144b, 154b. It should be noted that, while the absolute values of the permeabilities of the first and second regions 144a, 144b, 154a, 154b are important, most crucial is the relationship between them, such that the desired effect of creating preferred and less preferred pathways for magnetic flux can be realised.

In operation, an electrical current is passed through the coils 142, 152. This creates magnetic fields passing through the centre of each coil 142, 152, with lines of magnetic flux substantially parallel to the longitudinal axis L inside the coils. As a result of their raised magnetic permeability compared to the second regions 144b, 154b, the lines of magnetic flux preferentially pass through the first regions 144a, 154a, and in particular through the sub-regions 144c, 154c thereof. As a result of the magnetic flux passing through the sub-regions 144c, 154c, a force is exerted on the armatures 146, 156 that acts to move them away from the injection nozzle 110.

Since the first armature 146 is slidably mounted on the pull tube 136, the first armature 146 slides up the pull tube 136 (i.e. away from the injection nozzle 110) against the action of an armature return spring 147 mounted concentrically around the pull tube 136 directly below the engagement region 138 and closes the clearance 148 before engaging with the engagement region 138 of the pull tube 136. With the first armature 146 now engaged with the engagement region 138, both armatures 146, 156 are coupled to the pull tube 136 and further upward movement of the armatures 146, 156 causes the valve needle assembly 130 to move against the action of the return force provided by the valve needle return spring 134 and so act to move the valve needle assembly 130 to an open position. In this way, the coils 142, 152 and the first and second actuator arrangements 140, 150 act to apply an opening force to the valve needle assembly 130. The action of the slidable first armature 142 creates an impulse on engagement with the engagement region 138, providing an additional force that assists with initial opening of the valve needle assembly 130.

With the valve needle assembly 130 in an open position, fuel is allowed to flow out of the fuel injector 100 via the nozzle bore 114 and nozzle outlet(s) 116. When the fuel has been injected, the electrical current supplied to the coils 142, 152 is stopped. This stops the generation of magnetic flux by the coils 142, 152 and consequently the force acting on the first and second actuator arrangements 140, 150 is removed. The action of the valve needle return spring 134 then returns the valve needle assembly 130 to the closed position, thereby preventing further delivery of fuel from the injection nozzle 110. The armature return spring 147 acts to return the first armature 146 to its original position, restoring the clearance 148 between the first armature 146 and the engagement region 138 of the pull tube 136.

The different magnetic properties of the first regions 144a, 154a and the second regions 144b, 154b optimise the path of magnetic flux created by current passing through the coils 142, 152. By creating a preferential path for magnetic flux that only passes through the armatures 146, 156, the construction of the first and second actuator arrangements 140, 150 enable more efficient use of the magnetic flux generated. This means that either less energy is wasted to generate the same force, or that a higher overall actuation force can be produced to act on the valve needle assembly 130, allowing the injection pressure to be increased. The competing magnetic and mechanical demands on the system can therefore be mitigated through the use of regions with different magnetic permeabilities.

While it may be the case that different regions of the bodies 144, 154 have differing magnetic permeabilities as a result of the first regions 144a, 154a and the second regions 144b, 154b being made from different materials, it may also be the case that the first and second regions 144a, 144b, 154a, 154b may be formed by one material that has undergone different treatments so as to create different permeabilities. This may be different thermal or mechanical treatments, for example, which may be applied to separate components made from the same material or may even be applied to a single contiguous body 144, 154. Where the first and second regions 144a, 144b, 154a, 154b of the bodies 144, 154 are made from separate components, of the same material or otherwise, the first and second regions 144a, 144b, 154a, 154b may be welded together in order to ensure that the bodies 144, 154 are impermeable to flow of gaseous fuel therethrough.

Figure 3:
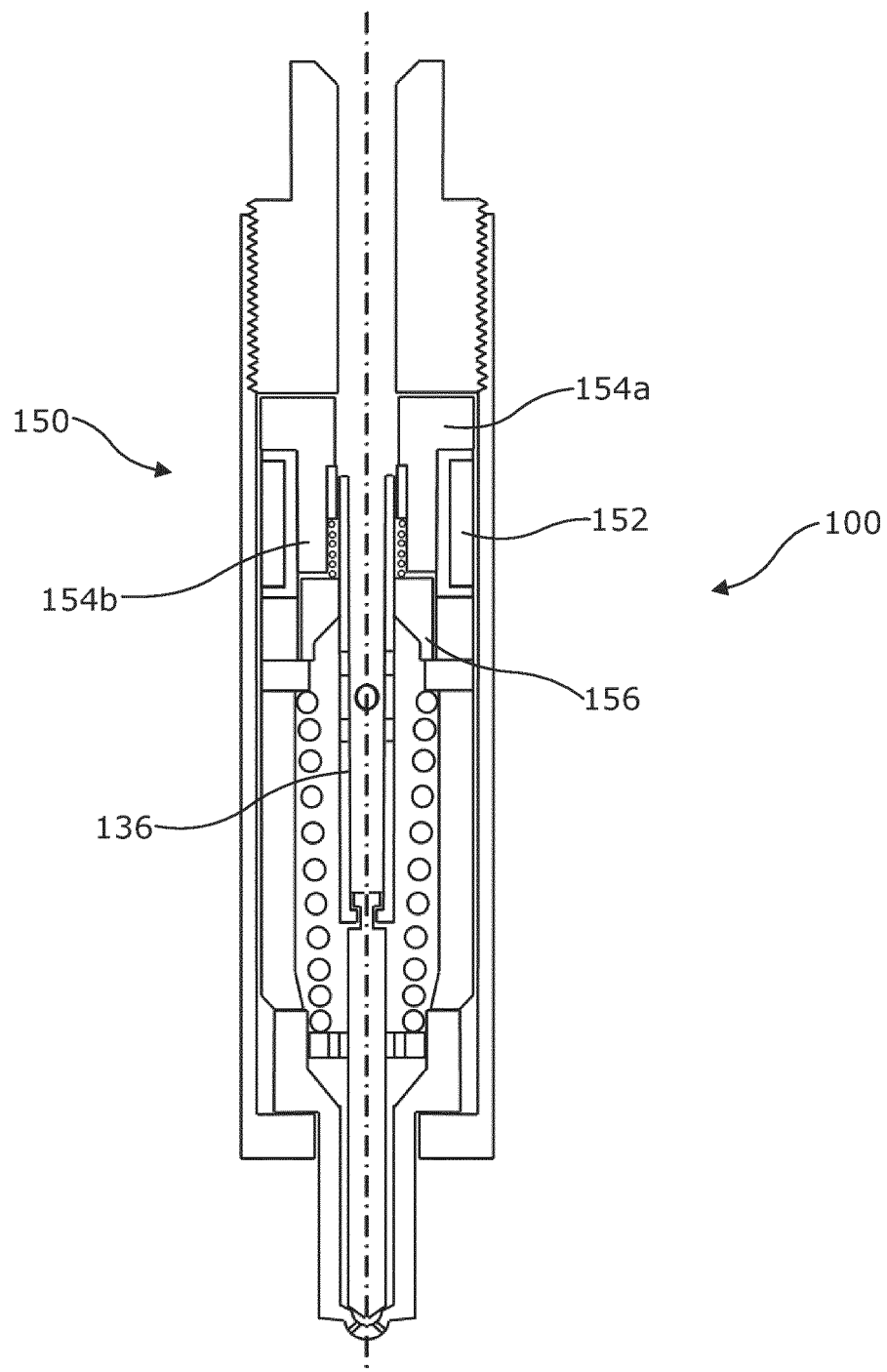
FIG. 3 is a cross sectional view of an alternative fuel injector according another embodiment of the present invention.

FIG. 3 shows a second embodiment of the fuel injector 100, which comprises a single actuator arrangement 150. The fuel injector 100 of the second embodiment is largely the same in structure and function as the fuel injector 100 described above except the actuator arrangement 140 with the sliding armature 146 has been removed such that only one actuator arrangement. In the embodiment shown in FIG. 3, this actuator arrangement 150 comprises an armature 156 that is directly mounted on the pull tube 136. While the benefits of the twin actuator arrangements, in particular the impulse provided by the sliding armature 146, are lost in this embodiment, the fuel injector 100 allows the benefits of the optimised magnetic flux pathway to be realised in less demanding applications, such as lower flow or lower pressure injectors, where lower costs are sought. Alternatively, the single actuator arrangement may comprise an armature 146 that is slidable mounted on the pull tube 136, such that an impulse is still provided. This may be useful when only small fueling quantities are required.

As a further alternative, in an embodiment where two actuator arrangements 140, 150 are present, the sliding armature 146 may only be operatively engaged with the pull tube 136 for a short period while initial opening of the valve needle assembly 130 is carried out, as described in European patent EP 2295785. This is due to the fact that the force required to lift the valve needle 132 decreases the further it is lifted away from the seat region 115. Allowing the sliding armature 146 to decouple from the pull tube 136 after initial opening of the valve needle assembly 130 therefore enables the first actuator arrangement 140 to act over a shorter distance. In turn, this allows the first actuator arrangement to be smaller, leading to a more compact design for the fuel injector 100.

It will be appreciated that various other examples of the invention are also envisaged without departing from the scope of the appended claims. Further, it will be appreciated that the above described examples are provided by way of example only, and that other examples of the invention may include any combination of the features described with reference to each of the examples above.

The invention claimed is:

1. A fuel injector for an internal combustion engine, the fuel injector comprising:
   an injection nozzle comprising a nozzle body provided with a nozzle bore;
   a valve needle assembly received within the nozzle bore and including a valve needle engageable with a seat region to control fuel delivery through at least one outlet of the injection nozzle;
   a first actuator arrangement and a second actuator arrangement, each actuator arrangement being operable to apply an opening force to an engagement region of the valve needle assembly to cause an opening movement thereof;
   wherein the first actuator arrangement comprises a first conductive coil mounted concentrically on a first body and a first armature configured to apply the opening force to the valve needle assembly, wherein the first armature is slidable with respect to the engagement region, and wherein the first armature and the engagement region are separated by a clearance when the valve needle is engaged with the seat region; and
   wherein the first body comprises a first, radially inner region and a second region disposed radially between the first coil and the first region,
   wherein a magnetic permeability value of the first region is higher than a magnetic permeability value of the second region, in use, and
   wherein the second actuator arrangement comprises a second conductive coil mounted on a second body and a second armature configured to apply the opening force to the valve needle assembly, and
   wherein the second body comprises a third, radially inner region and a fourth region disposed radially between the second coil and the third region,
   wherein a magnetic permeability value of the third region is higher than a magnetic permeability value of the fourth region, in use.

2. The fuel injector of claim 1, wherein the magnetic permeability value of the first region is at least an order of magnitude higher than the magnetic permeability value of the second region, in use.

3. The fuel injector of claim 1, wherein the relative magnetic permeability value of the first region is at least 500, in use.

4. The fuel injector of claim 1, wherein the relative magnetic permeability value of the second region is at most 50, in use.

5. The fuel injector of claim 1, wherein the valve needle assembly further comprises a pull member engaged with the first armature and operably connected to the valve needle.

6. The fuel injector of claim 1, wherein the fuel injector is configured to deliver a gaseous fuel to an internal combustion engine.

7. The fuel injector of claim 1, wherein the first region comprises a first material and the second region comprises a second material.

8. The fuel injector of claim 7, wherein the first and second materials are welded to each other to form the body.

9. The fuel injector of claim 1, wherein the first region and the second region correspond to regions of the same material with different magnetic permeability values.

10. The fuel injector of claim 1, wherein the first actuator arrangement is operable to cause initial opening of the valve needle assembly and then to decouple from the valve needle assembly in response to said initial opening and the second actuator arrangement is operable to assist said initial opening and then to complete the opening of the valve needle assembly when the first actuator arrangement decouples from the valve needle assembly.

11. The fuel injector of claim 1, wherein the second armature is directly coupled to the valve needle assembly.

* * * * *